United States Patent
Wang et al.

(10) Patent No.: US 11,951,350 B2
(45) Date of Patent: Apr. 9, 2024

(54) UPPER LIMB REHABILITATION TRAINING SYSTEM IN TWO-PERSON STANDING TYPE AND APPLICATION METHOD THEREOF

(71) Applicant: GUANGZHOU XIAOKANG MEDICAL TECHNOLOGY CO., LTD, Guangzhou (CN)

(72) Inventors: Junhua Wang, Guangzhou (CN); Zhaokun Wang, Guangzhou (CN)

(73) Assignee: GUANGZHOU XIAOKANG MEDICAL TECHNOLOGY CO., LTD, Guangzhou (CN)

( * ) Notice: Subject to any disclaimer, the term of this patent is extended or adjusted under 35 U.S.C. 154(b) by 815 days.

(21) Appl. No.: 17/266,619

(22) PCT Filed: Feb. 20, 2019

(86) PCT No.: PCT/CN2019/075596
§ 371 (c)(1),
(2) Date: Feb. 8, 2021

(87) PCT Pub. No.: WO2019/218738
PCT Pub. Date: Nov. 21, 2019

(65) Prior Publication Data
US 2021/0291011 A1    Sep. 23, 2021

(30) Foreign Application Priority Data

May 14, 2018    (CN) .......................... 201820719050.9
Oct. 10, 2018    (CN) .......................... 201811187741.X

(51) Int. Cl.
*A63B 22/00*        (2006.01)
*A63B 21/00*        (2006.01)
(Continued)

(52) U.S. Cl.
CPC .... *A63B 22/0002* (2013.01); *A63B 21/00181* (2013.01); *A63B 21/4035* (2015.10);
(Continued)

(58) Field of Classification Search
CPC .......... A63B 22/0002; A63B 21/00181; A63B 21/4035; A63B 2022/0094;
(Continued)

(56) References Cited

U.S. PATENT DOCUMENTS

2006/0287617 A1    12/2006    Taub et al.
2010/0179453 A1*    7/2010    Schweighofer ....... A61B 5/1118
600/595
(Continued)

FOREIGN PATENT DOCUMENTS

CN    104706499 A    6/2015
CN    205460867 U    8/2016
(Continued)

*Primary Examiner* — Robert P Bullington
*Assistant Examiner* — Stephen Alvesteffer
(74) *Attorney, Agent, or Firm* — Bayramoglu Law Offices LLC

(57) ABSTRACT

An upper limb rehabilitation training system in two-person standing type and an application method thereof are provided. The upper limb rehabilitation training system includes an upper limb rehabilitation training platform, two weight-reducing suspending support structures arranged oppositely, and two standing frames arranged oppositely; the upper limb rehabilitation training platform includes an all-in-one computer which includes a computer and a touch display screen, and a periphery of the touch display screen is provided with a grating structure; the upper limb rehabilitation training platform is provided with a two-person interactive upper limb training module including two control handles, a virtual training prop and a virtual training scene. The two control handles are suspended from the two weight-reducing suspending support structures, respectively; the
(Continued)

grating structure is configured to identify the control handles and positions thereof. The computer controls the two control handles to perform game interaction with the virtual training prop.

18 Claims, 2 Drawing Sheets

(51) Int. Cl.
 *A63F 13/812* (2014.01)
 *A63F 13/843* (2014.01)
(52) U.S. Cl.
 CPC ........ *A63F 13/812* (2014.09); *A63F 13/843* (2014.09); *A63B 2022/0094* (2013.01); *A63B 2243/0095* (2013.01); *A63F 2300/8011* (2013.01); *A63F 2300/8082* (2013.01); *A63F 2300/8088* (2013.01)
(58) Field of Classification Search
 CPC ........ A63B 2243/0095; A63B 23/1209; A63B 2024/0096; A63B 2071/0658; A63B 22/00; A63B 2022/0092; A63B 21/285; A63B 21/4043; A63F 13/812; A63F 13/843; A63F 2300/8011; A63F 2300/8082; A63F 2300/8088; A63F 13/2145; A63F 13/428; A63F 13/212; A63F 13/90
 USPC ......................................................... 434/247
 See application file for complete search history.

(56) References Cited

U.S. PATENT DOCUMENTS

| | | | | |
|---|---|---|---|---|
| 2011/0251021 | A1* | 10/2011 | Zavadsky | ............... A63F 13/28 482/5 |
| 2018/0369644 | A1* | 12/2018 | Slobodnik | .......... A63B 23/1209 |
| 2019/0060708 | A1* | 2/2019 | Fung | ..................... A63B 22/06 |

FOREIGN PATENT DOCUMENTS

| | | |
|---|---|---|
| CN | 106823294 A | 6/2017 |
| CN | 209437982 U | 9/2019 |
| KR | 20120099894 A | 9/2012 |

\* cited by examiner

UPPER LIMB REHABILITATION TRAINING SYSTEM IN TWO-PERSON STANDING TYPE AND APPLICATION METHOD THEREOF

CROSS REFERENCE TO THE RELATED APPLICATIONS

This application is the national stage entry of International Application No. PCT/CN2019/075596, filed on Feb. 20, 2019, which is based upon and claims priority to Chinese Patent Application No. 201811187741.X, filed on Oct. 10, 2018, and Chinese Patent Application No. 201820719050.9, filed on May 14, 2018, the entire contents of which are incorporated herein by reference.

TECHNICAL FIELD

The present invention relates to the technical field of medical rehabilitation devices, particularly to an upper limb rehabilitation training system in two-person standing type and an application method thereof.

BACKGROUND

Many trainers suffering cerebral apoplexy, traumatic brain injury and spinal cord injury have upper limb dyskinesia and inability to stand, affecting quality of their lives, severely. For these trainers, current rehabilitation measures mainly include: a scrub board is used by a rehabilitation therapist to help trainers perform upper limb rehabilitation training one-on-one; or, a standing electric bed and a standing frame are used for standing rehabilitation training. The aforementioned two types of rehabilitation devices have problems of boring training, irregular training and training in low efficiency, and the devices are scattered and occupy a lot of space.

An upper limb rehabilitation training system in two-person standing type designed by us is mainly used to raise patients' interest in rehabilitation training, improve rehabilitation effects and increase rehabilitation efficiency.

SUMMARY

The present invention provides a rehabilitation training system, which has upper limb virtual reality rehabilitation training environment and upper limb automatic evaluation function, and can complete two-person upper limb training and two-person standing training at the same time.

The present invention adopts the following technical solutions:

An upper limb rehabilitation training system in two-person standing type comprises: an upper limb rehabilitation training platform (1), a weight-reducing suspending support structure (2), and a standing frame (3); there are two weight-reducing suspending support structures (2) arranged oppositely and two standing frames (3) arranged oppositely; the two weight-reducing suspending support structures (2) are arranged opposite to each other, on a pair of sides of the upper limb rehabilitation training platform (1), while the two standing frames (3) are arranged opposite to each other, on another pair of sides of the upper limb rehabilitation training platform (1); the upper limb rehabilitation training platform (1) comprises a base (10) and an all-in-one computer (11); the all-in-one computer (11) is mounted on the base (10); the all-in-one computer (11) comprises a computer and a touch display screen (111), the touch display screen (111) covers an outer surface of the computer, and a periphery of the touch display screen (111) is provided with a grating structure (14); the upper limb rehabilitation training platform (1) is provided with a two-person interactive upper limb training module, and the two-person interactive upper limb training module comprises two control handles (15), a virtual training prop and a virtual training scene, the two control handles (15) are suspended from the two weight-reducing suspending support structures (2), respectively; the virtual training prop and the virtual training scene are displayed on the touch display screen (111), the grating structure (14) is configured to identify the control handles (15) of two trainers and positions of the two control handles (15); and, in the virtual training scene, the computer controls the two control handles (15) to perform game interaction with the virtual training prop; the upper limb rehabilitation training platform (1) is also provided with a single-person training module for one person to use.

Preferably, the upper limb rehabilitation training platform (1) is provided with a two-person competition module, the virtual training prop of the two-person competition module is a virtual volleyball, and the virtual training scene of the two-person competition module is a virtual volleyball court, each trainer uses each of the control handles (15) to hit the virtual volleyball back and forth; or, the virtual training prop of the two-person competition module is a virtual football, and the virtual training scene of the two-person competition module is a virtual football field, one trainer uses the control handle (15) to pass the virtual football, and the other trainer uses the control handle (15) to receive the virtual football, after a period of time, roles of the two trainers are exchanged; or, the virtual training prop of the two-person competition module is a virtual fruit, and the virtual training scene of the two-person competition module is a virtual fruit scene, the two trainers grab the virtual fruit at the fastest speed through the control handles (15).

Preferably, the upper limb rehabilitation training platform (1) is provided with a two-person collaboration module, the virtual training prop of the two-person collaboration module is a virtual fishing net, and the virtual training scene of the two-person collaboration module is a virtual pond and a shoal of virtual fish, the two trainers coordinate to move the virtual fishing net through the control handles (15), so as to capture the shoal of virtual fish in the virtual pond; or, the virtual training prop of the two-person collaboration module is a virtual boat, and the virtual training scene of the two-person collaboration module is a virtual river, the two trainers use the control handles (15) to row on both sides of the virtual boat; or, the virtual training prop of the two-person collaboration module is a plurality of virtual weights, and the virtual training scene of the two-person collaboration module is a virtual seesaw, the two trainers constantly add virtual weights on both sides of the virtual seesaw through the control handles (15).

Preferably, the upper limb rehabilitation training platform (1) is provided with a single-person training module, the virtual training prop of the single-person training module is a virtual yacht, and the virtual training scene of the single-person training module is a virtual river channel, a single trainer moves with the virtual yacht in the virtual river channel through the control handles (15); or, the virtual training prop of the single-person training module is a virtual eraser, and the virtual training scene of the single-person training module is a virtual landscape which is covered, a single trainer drives the virtual eraser through the control handles (15) to erase a covering layer on the virtual landscape, so as to reveal a beautiful virtual landscape; or, the virtual training prop of the single-person training module is a virtual animal or fruit, and the virtual training scene of the single-person training module is a virtual plank image or other plane image, a single trainer hits the virtual animal or fruit through the control handles (15), so as to obtain a corresponding score.

Preferably, the base (10) comprises a bottom frame (101) and a platform fixing frame (102) thereon, a lifting pushrod (12) is connected between the platform fixing frame (102) and the bottom frame (101); the all-in-one computer (11) is mounted on the platform fixing frame (102).

Preferably, the two weight-reducing suspending support structures (2) have the same structure, each of which comprises a counterweight box (20), a guide rod (21), a suspension rope (22) and a cross bar (24); wherein a lower end of the guide rod (21) is connected with the counterweight box (20), and an upper end of the same is connected with the cross bar (24); the cross bar (24) extends above the all-in-one computer (11) and is capable of rotating around the guide rod (21), the control handle (15) is suspended from the cross bar (24) by the suspension rope (22); counter weights (27) are placed in the counterweight box (20), and a selection lever (28) is connected to the counter weights (27); the counter weights (27) are connected with the suspension rope (22).

Preferably, the two standing frames (3) have the same structure, each of which comprises a standing base frame (30), knee blocks (31), a chest block (29) and a hip block (32) mounted on the standing base frame (30), the standing base frame (30) is fixed with foot pedal devices (200), the foot pedal devices (200) comprise a two-foot pedal angle adjustment structure and a two-foot pedal distance adjustment structure.

Preferably, a vertical column (33) is arranged on the standing base frame (30), a first sliding frame (34) and a second sliding frame (35) are slidably mounted on the vertical column (33), the knee blocks (31) are mounted on the first sliding frame (34), the second sliding frame (35) is provided with the chest block (29) and a hip guard bar (37), and the hip block (32) is fixed on the hip guard bar (37); both the first sliding frame (34) and the second sliding frame (35) are provided with a locking structure, the standing base frame (30) is provided with a second fixing structure for fixing with the bottom frame (101).

Preferably, the upper limb rehabilitation training platform (1) can also be combined with one weight-reducing suspending support structure (2) and one standing frame (3); the weight-reducing suspending support structure and the standing frame are arranged opposite to each other, on a pair of sides of the upper limb rehabilitation training platform (1); the upper limb rehabilitation training platform (1) is only provided with the single-person training module.

An application method for the upper limb rehabilitation training system in two-person standing type comprises following steps:
① pushing two trainers to the front of the system by wheelchairs, adjusting the height of the two standing frames (3) and the all-in-one computer (11) according to the height of the two trainers, and then using the standing frames (3) to fix the two trainers in a face-to-face standing state;
② According to the degree of paralysis of upper limbs of the two trainers, using the weight-reducing suspending support structure (2) to select weight-reducing weight suitable for the trainers, so as to help paralyzed upper limbs of the trainers;
③ selecting the two-person interactive upper limb training module suitable for training the two trainers through the touch display screen (111) by a doctor, and manipulating two control handles (15) to perform game interaction with the virtual training prop and the virtual training scene by the two trainers, respectively; or, using the system by one person, selecting the single-person upper limb training module suitable for training the one person, manipulating the control handles (15) to perform game interaction with the virtual training prop and the virtual training scene by a single trainer.

In conclusion, the upper limb rehabilitation training system in two-person standing type provided by the present invention can train two persons at the same time, with higher training efficiency; when training the upper limbs, the standing training is also completed. Furthermore, through two-person competitive interactive games, such as football, badminton, etc., or coordinated interactive games, such as rowing games, there is competition and cooperation in the training process, which can mobilize more of the trainer's interest, and when the trainer's interest in training is higher, it can also help the trainer to recover from depression and confidence problems, obtaining better rehabilitation effects. As needed, the device can also be used for training upper limbs while a single person is standing, only a single-person virtual training module is required. As needed, the device can also be modified into an upper limb rehabilitation training system in single-person standing type, which only uses a single-person virtual training module, for a single-person training only.

DETAILED DESCRIPTION OF THE EMBODIMENTS

The technical solutions in the embodiments of the present invention will be clearly and completely described below in conjunction with the drawings in the embodiments of the present invention. It should be understood that the specific embodiments described herein are only used to explain the present invention, and are not used to limit the protection scope of the present invention.

Figure 1:
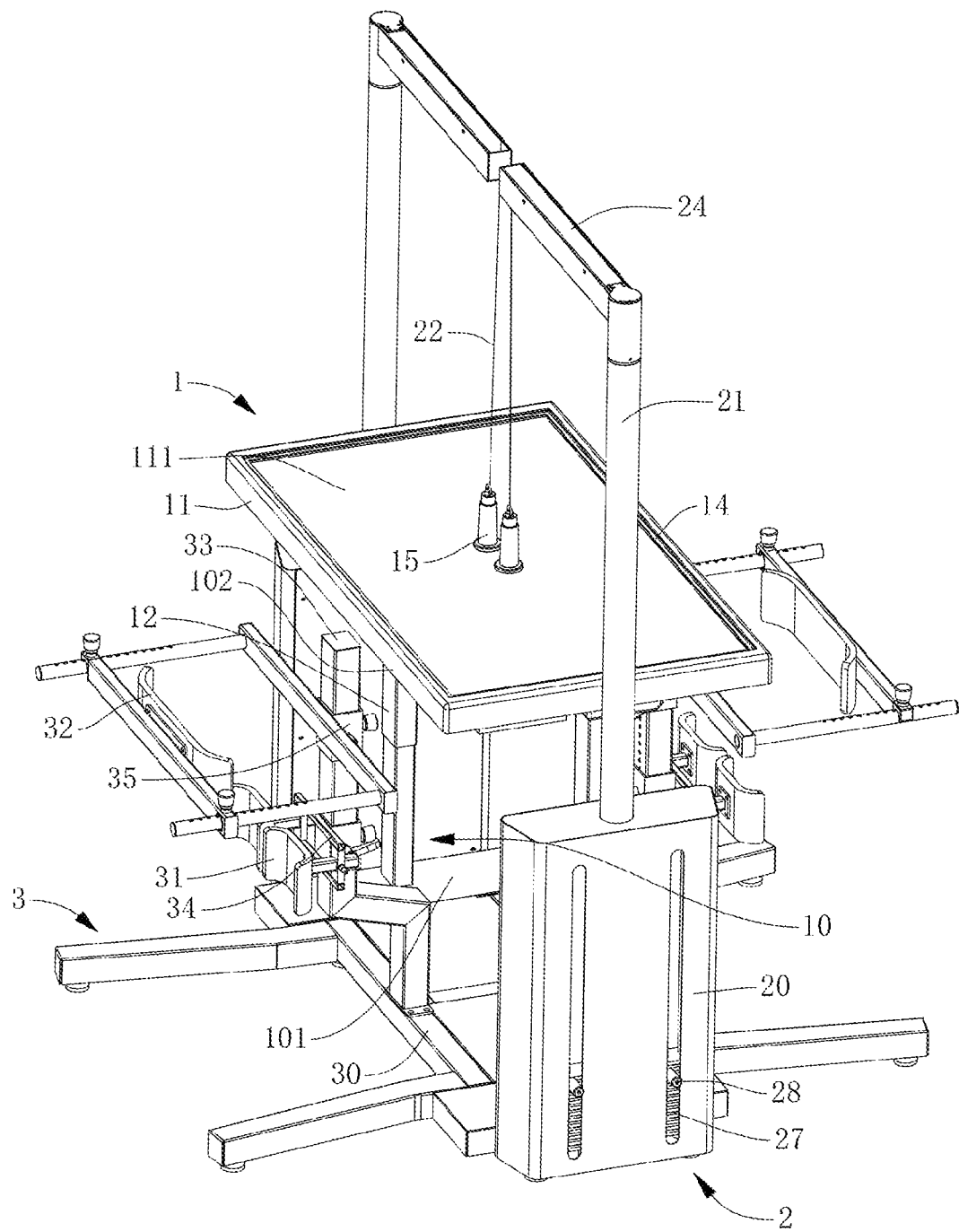
FIG. 1 is a structure diagram of an upper limb rehabilitation training system in two-person standing type provided by the present invention.
Figure 2:
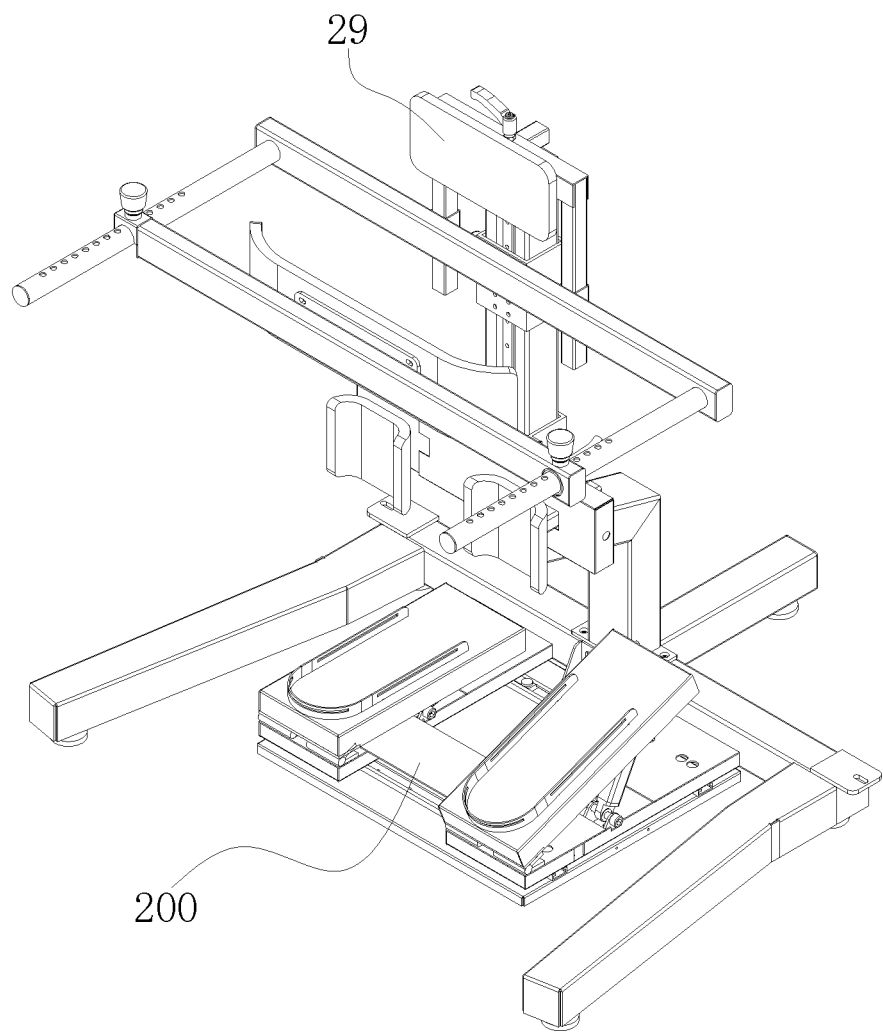
FIG. 2 is a structure diagram of an upper limb rehabilitation training system in two-person standing type provided by the present invention.

Please refer to FIG. 1 and FIG. 2, the present invention provides an upper limb rehabilitation training system in two-person standing type, the upper limb rehabilitation training system in two-person standing type comprises an upper limb rehabilitation training platform 1, a weight-reducing suspending support structure 2, and a standing frame 3, there are two weight-reducing suspending support structures 2 arranged oppositely and two standing frames 3 arranged oppositely; the two weight-reducing suspending support structures 2 are arranged opposite to each other, on a pair of sides of the upper limb rehabilitation training platform 1, while the two standing frames 3 are arranged opposite to each other, on another pair of sides of the upper limb rehabilitation training platform 1; the upper limb rehabilitation training platform 1 comprises a base 10 and an all-in-one computer 11; the all-in-one computer 11 is mounted on the base 10; the all-in-one computer 11 comprises a computer and a touch display screen 111, the touch display screen 111 covers an outer surface of the computer, and a periphery of the touch display screen 111 is provided with a grating structure 14; the upper limb rehabilitation training platform 1 is provided with a two-person interactive upper limb training module, and the two-person interactive upper limb training module comprises two control handles 15, a virtual training prop and a virtual training scene, the two control handles 15 are suspended from the two weight-reducing suspending support structures 2, respectively; the virtual training prop and the virtual training scene are displayed on the touch display screen 111, the grating structure 14 is configured to identify the control handles 15 of two trainers and positions of the two control handles 15; and, in the virtual training scene, the computer controls the two control handles 15 to perform game interaction with the virtual training prop; the upper limb rehabilitation training platform 1 is also provided with a single-person training module for one person to use.

Furthermore, the upper limb rehabilitation training platform 1 is provided with a two-person competition module, the virtual training prop of the two-person competition module is a virtual volleyball, and the virtual training scene of the two-person competition module is a virtual volleyball court, each trainer uses each of the control handles 15 to hit the virtual volleyball back and forth; or, the virtual training prop of the two-person competition module is a virtual football, and the virtual training scene of the two-person competition module is a virtual football field, one trainer uses the control handle 15 to pass the virtual football, and the other trainer uses the control handle 15 to receive the virtual football, after a period of time, roles of the two trainers are exchanged; or, the virtual training prop of the two-person competition module is a virtual fruit, and the virtual training scene of the two-person competition module is a virtual fruit scene, the two trainers grab the virtual fruit at the fastest speed through the control handles 15.

Furthermore, the upper limb rehabilitation training platform 1 is provided with a two-person collaboration module, the virtual training prop of the two-person collaboration module is a virtual fishing net, and the virtual training scene of the two-person collaboration module is a virtual pond and a shoal of virtual fish, the two trainers coordinate to move the virtual fishing net through the control handles 15, so as to capture the shoal of virtual fish in the virtual pond; or, the virtual training prop of the two-person collaboration module is a virtual boat, and the virtual training scene of the two-person collaboration module is a virtual river, the two trainers use the control handles 15 to row on both sides of the virtual boat; or, the virtual training prop of the two-person collaboration module is a plurality of virtual weights, and the virtual training scene of the two-person collaboration module is a virtual seesaw, the two trainers constantly add virtual weights on both sides of the virtual seesaw through the control handles 15.

Furthermore, the upper limb rehabilitation training platform 1 is provided with a single-person training module, the virtual training prop of the single-person training module is a virtual yacht, and the virtual training scene of the single-person training module is a virtual river channel, a single trainer moves with the virtual yacht in the virtual river channel through the control handles 15; or, the virtual training prop of the single-person training module is a virtual eraser, and the virtual training scene of the single-person training module is a virtual landscape which is covered, a single trainer drives the virtual eraser through the control handles 15 to erase a covering layer on the virtual landscape, so as to reveal a beautiful virtual landscape; or, the virtual training prop of the single-person training module is a virtual animal or fruit, and the virtual training scene of the single-person training module is a virtual plank image or other plane image, a single trainer hits the virtual animal or fruit through the control handles 15, so as to obtain a corresponding score.

Furthermore, the base 10 comprises a bottom frame 101 and a platform fixing frame 102 thereon, a lifting pushrod 12 is connected between the platform fixing frame 102 and the bottom frame 101; the all-in-one computer 11 is mounted on the platform fixing frame 102.

Furthermore, the two weight-reducing suspending support structures 2 have the same structure, each of which comprises a counterweight box 20, a guide rod 21, a suspension rope 22 and a cross bar 24; a lower end of the guide rod 21 is connected with the counterweight box 20, and an upper end of the same is connected with the cross bar 24; the cross bar 24 extends above the all-in-one computer 11 and is capable of rotating around the guide rod 21, the control handle 15 is suspended from the cross bar 24 by the suspension rope 22; counter weights 27 are placed in the counterweight box 20, and a selection lever 28 is connected to the counter weights 27; the counter weights 27 are connected with the suspension rope 22.

Furthermore, the two standing frames 3 have the same structure, each of which comprises a standing base frame 30, knee blocks 31, a chest block 29 and a hip block 32 mounted on the standing base frame 30, the standing base frame 30 is fixed with foot pedal devices 200, the foot pedal devices 200 comprise a two-foot pedal angle adjustment structure and a two-foot pedal distance adjustment structure.

Furthermore, a vertical column 33 is arranged on the standing base frame 30, a first sliding frame 34 and a second sliding frame 35 are slidably mounted on the vertical column 33, the knee blocks 31 are mounted on the first sliding frame 34, the second sliding frame 35 is provided with the chest block 29 and a hip guard bar 37, and the hip block 32 is fixed on the hip guard bar 37; both the first sliding frame 34 and the second sliding frame 35 are provided with a locking structure, the standing base frame 30 is provided with a second fixing structure for fixing with the bottom frame 101.

Furthermore, the upper limb rehabilitation training platform 1 can also be combined with one weight-reducing suspending support structure 2 and one standing frame 3; and, the weight-reducing suspending support structure and the standing frame are arranged opposite to each other, on a pair of sides of the upper limb rehabilitation training platform 1; the upper limb rehabilitation training platform 1 is only provided with the single-person training module.

In use, firstly, the hip guard bar 37 is opened; when a patient stands on the standing frame 3, the patient's two knees fit the corresponding knee blocks 31, and then the hip guard bar 37 is rotated so that the hip block 32 blocks the patient's buttocks. Additionally, the standing base frame 30 is provided with the second fixing structure for fixing with the bottom frame 101, so that the upper limb rehabilitation training platform 1 and the standing frame 3 are fixed with each other.

An application method for the upper limb rehabilitation training system in two-person standing type comprises following steps:

① pushing two trainers to the front of the system by wheelchairs, adjusting the height of the two standing frames 3 and the all-in-one computer 11 according to the height of the two trainers, and then using the standing frames 3 to fix the two trainers in a face-to-face standing state;

② According to the degree of paralysis of upper limbs of the two trainers, using the weight-reducing suspending support structure 2 to select weight-reducing weight suitable for the trainers, so as to help paralyzed upper limbs of the trainers;

③ selecting the two-person interactive upper limb training module suitable for training the two trainers through the touch display screen 111 by a doctor, and manipulating two control handles 15 to perform game interaction with the virtual training prop and the virtual training scene by the two trainers, respectively; or, using the system by one person, selecting the single-person upper limb training module suitable for training the one person, manipulating the control handles 15 to perform game interaction with the virtual training prop and the virtual training scene by a single trainer.

In conclusion, the upper limb rehabilitation training system in two-person standing type provided by the present invention has upper limb virtual reality rehabilitation training environment and upper limb automatic evaluation function, and can complete two-person standing training and upper limb training at the same time, which can train two persons at the same time, with higher training efficiency; when training the upper limbs, the standing training is also completed. Furthermore, through two-person competitive interactive games, such as volleyball, football, grabing fruit, etc., or coordinated interactive games, such as fishing, rowing, and seesaw, etc., there is competition and cooperation in the training process, which can mobilize more of the trainer's interest, and when the trainer's interest in training is higher, it can also help the trainer to recover from depression and confidence problems, obtaining better rehabilitation effects. As needed, the device can also be used for training upper limbs while a single person is standing, only a single-person virtual training module is required. As needed, the device can also be modified into an upper limb rehabilitation training system in single-person standing type, which only uses a single-person virtual training module, for training upper limbs of a single person only.

Embodiments of the present invention have been described above, but they do not limit the patent scope of the present invention, any equivalent structure or equivalent process modification used according to the contents of the specification in the present invention, no matter whether it is directly or indirectly used in any other related technical field, should be included within the protection scope of the present invention.

What is claimed is:

1. An upper limb rehabilitation training system in two-person standing type, comprising:
   an upper limb rehabilitation training platform, two weight-reducing suspending support structures, and two standing frames, wherein, the two weight-reducing suspending support structures are arranged oppositely and the two standing frames are arranged oppositely;
   the two weight-reducing suspending support structures are arranged opposite to each other, on a first pair of sides of the upper limb rehabilitation training platform, while the two standing frames are arranged opposite to each other, on a second pair of sides of the upper limb rehabilitation training platform;
   the upper limb rehabilitation training platform comprises a base and an all-in-one computer;
   the all-in-one computer is mounted on the base;
   the all-in-one computer comprises a computer and a touch display screen,
   the touch display screen covers an outer surface of the computer, and a periphery of the touch display screen is provided with a grating structure;
   the upper limb rehabilitation training platform is provided with a two-person interactive upper limb training module, and the two-person interactive upper limb training module comprises two control handles, a virtual training prop and a virtual training scene, the two control handles are suspended from the two weight-reducing suspending support structures, respectively;
   the virtual training prop and the virtual training scene are displayed on the touch display screen, the grating structure is configured to identify the two control handles of two trainers and positions of the two control handles; and, in the virtual training scene, the computer controls the two control handles to perform a game interaction with the virtual training prop; and
   the upper limb rehabilitation training platform is further provided with a single-person upper limb training module for one person to use.

2. The upper limb rehabilitation training system according to claim 1, wherein the upper limb rehabilitation training platform is provided with a two-person competition module, a virtual training prop of the two-person competition module is a virtual volleyball, and a virtual training scene of the two-person competition module is a virtual volleyball court, each trainer of the two trainers uses each of the two control handles to hit the virtual volleyball back and forth; or
   the virtual training prop of the two-person competition module is a virtual football, and the virtual training scene of the two-person competition module is a virtual football field, a first trainer of the two trainers uses a first control handle of the two control handles to pass the virtual football, and a second trainer of the two trainers uses a second control handle of the two control handles to receive the virtual football, after a period of time, roles of the two trainers are exchanged; or
   the virtual training prop of the two-person competition module is a virtual fruit, and the virtual training scene of the two-person competition module is a virtual fruit scene, the two trainers grab the virtual fruit at a fastest speed through the two control handles.

3. The upper limb rehabilitation training system according to claim 1, wherein the upper limb rehabilitation training platform is provided with a two-person collaboration module, a virtual training prop of the two-person collaboration module is a virtual fishing net, and a virtual training scene of the two-person collaboration module is a virtual pond and a shoal of virtual fish, the two trainers coordinate to move the virtual fishing net through the two control handles to capture the shoal of virtual fish in the virtual pond; or
   the virtual training prop of the two-person collaboration module is a virtual boat, and the virtual training scene of the two-person collaboration module is a virtual river, the two trainers use the two control handles to row on both sides of the virtual boat; or
   the virtual training prop of the two-person collaboration module is a plurality of virtual weights, and the virtual training scene of the two-person collaboration module is a virtual seesaw, the two trainers constantly add the plurality of virtual weights on both sides of the virtual seesaw through the two control handles.

4. The upper limb rehabilitation training system according to claim 1, wherein the upper limb rehabilitation training platform (1) is provided with a single-person training module, a virtual training prop of the single-person upper limb training module is a virtual yacht, and a virtual training scene of the single-person upper limb training module is a virtual river channel, a single trainer of the two trainers moves with the virtual yacht in the virtual river channel through the two control handles; or the virtual training prop of the single-person upper limb training module is a virtual eraser, and the virtual training scene of the single-person upper limb training module is a virtual landscape, wherein the virtual landscape is covered, the single trainer drives the virtual eraser through the two control handles to erase a covering layer on the virtual landscape to reveal the virtual landscape; or the virtual training prop of the single-person upper limb training module is a virtual animal or fruit, and the virtual training scene of the single-person upper limb training module is a virtual plank image or other plane image, the single trainer hits the virtual animal or fruit through the two control handles to obtain a corresponding score.

5. The upper limb rehabilitation training system according to claim 1, wherein the base comprises a bottom frame and a platform fixing frame on the base, a lifting pushrod is connected between the platform fixing frame and the bottom frame; and the all-in-one computer is mounted on the platform fixing frame.

6. The upper limb rehabilitation training system according to claim 1, wherein the two weight-reducing suspending support structures have an identical structure, each of the two weight-reducing suspending support structures comprises a counterweight box, a guide rod, a suspension rope and a cross bar;

wherein a lower end of the guide rod is connected with the counterweight box, and an upper end of the guide rod is connected with the cross bar;

the cross bar extends above the all-in-one computer and the cross bar is permitted to rotate around the guide rod, a control handle of the two control handles is suspended from the cross bar by the suspension rope;

counter weights are placed in the counterweight box, and a selection lever is connected to the counter weights; and the counter weights are connected with the suspension rope.

7. The upper limb rehabilitation training system according to claim 1, wherein the two standing frames have an identical structure, each of the two standing frames comprises a standing base frame, knee blocks, a chest block and a hip block mounted on the standing base frame, the standing base frame is fixed with foot pedal devices, the foot pedal devices comprise a two-foot pedal angle adjustment structure and a two-foot pedal distance adjustment structure.

8. The upper limb rehabilitation training system according to claim 7, wherein a vertical column is arranged on the standing base frame, a first sliding frame and a second sliding frame are slidably mounted on the vertical column, the knee blocks are mounted on the first sliding frame, the second sliding frame is provided with the chest block and a hip guard bar, and the hip block is fixed on the hip guard bar; and both the first sliding frame and the second sliding frame are provided with a locking structure, the standing base frame is provided with a second fixing structure for fixing with a bottom frame.

9. The upper limb rehabilitation training system according to claim 1, wherein the upper limb rehabilitation training platform is combined with one weight-reducing suspending support structure of the two weight-reducing suspending support structures and one standing frame of the two standing frames; the one weight-reducing suspending support structure and the one standing frame are arranged opposite to each other, on the first and second pairs of sides of the upper limb rehabilitation training platform; and the upper limb rehabilitation training platform is only provided with the single-person upper limb training module.

10. An application method for the upper limb rehabilitation training system in the two-person standing type according to claim 1, comprising following steps:

1) pushing the two trainers to a front of the upper limb rehabilitation training system by wheelchairs, adjusting a height of the two standing frames and the all-in-one computer according to a height of the two trainers, and then using the two standing frames to fix the two trainers in a face-to-face standing state;

2) according to a degree of paralysis of upper limbs of the two trainers, using the two weight-reducing suspending support structures to select a weight-reducing weight suitable for the two trainers to help paralyzed upper limbs of the two trainers;

3) selecting the two-person interactive upper limb training module suitable for training the two trainers through the touch display screen by a doctor, and manipulating the two control handles to perform the game interaction with the virtual training prop and the virtual training scene by the two trainers, respectively; or using the upper limb rehabilitation training system by one trainer of the two trainers, selecting the single-person upper limb training module suitable for training the one trainer, manipulating the two control handles to perform the game interaction with the virtual training prop and the virtual training scene by the one trainer.

11. The application method according to claim 10, wherein the upper limb rehabilitation training platform is provided with a two-person competition module, a virtual training prop of the two-person competition module is a virtual volleyball, and a virtual training scene of the two-person competition module is a virtual volleyball court, each trainer of the two trainers uses each of the two control handles to hit the virtual volleyball back and forth; or the virtual training prop of the two-person competition module is a virtual football, and the virtual training scene of the two-person competition module is a virtual football field, a first trainer of the two trainers uses a first control handle of the two control handles to pass the virtual football, and a second trainer of the two trainers uses a second control handle of the two control handles to receive the virtual football, after a period of time, roles of the two trainers are exchanged; or the virtual training prop of the two-person competition module is a virtual fruit, and the virtual training scene of the two-person competition module is a virtual fruit scene, the two trainers grab the virtual fruit at a fastest speed through the two control handles.

12. The application method according to claim 10, wherein the upper limb rehabilitation training platform is provided with a two-person collaboration module, a virtual training prop of the two-person collaboration module is a virtual fishing net, and a virtual training scene of the two-person collaboration module is a virtual pond and a shoal of virtual fish, the two trainers coordinate to move the virtual fishing net through the two control handles to capture the shoal of virtual fish in the virtual pond; or the virtual training prop of the two-person collaboration module is a virtual boat, and the virtual training scene of the two-person collaboration module is a virtual river, the two trainers use the two control handles to row on both sides of the virtual boat; or the virtual training prop of the two-person collaboration module is a plurality of virtual weights, and the virtual training scene of the two-person collaboration module is a virtual seesaw, the two trainers constantly add the plurality of virtual weights on both sides of the virtual seesaw through the two control handles.

13. The application method according to claim 10, wherein a virtual training prop of the single-person upper limb training module is a virtual yacht, and a virtual training scene of the single-person upper limb training module is a virtual river channel, a single trainer of the two trainers moves with the virtual yacht in the virtual river channel through the two control handles; or the virtual training prop of the single-person upper limb training module is a virtual eraser, and the virtual training scene of the single-person upper limb training module is a virtual landscape, wherein the virtual landscape is covered, the single trainer drives the virtual eraser through the two control handles to erase a covering layer on the virtual landscape to reveal the virtual landscape; or the virtual training prop of the single-person upper limb training module is a virtual animal or fruit, and the virtual training scene of the single-person upper limb training module is a virtual plank image or other plane image, the single trainer hits the virtual animal or fruit through the two control handles to obtain a corresponding score.

14. The application method according to claim 10, wherein the base comprises a bottom frame and a platform fixing frame on the base, a lifting pushrod is connected between the platform fixing frame and the bottom frame; and the all-in-one computer is mounted on the platform fixing frame.

15. The application method according to claim 10, wherein the two weight-reducing suspending support structures have an identical structure, each of the two weight-reducing suspending support structures comprises a counterweight box, a guide rod, a suspension rope and a cross bar;

wherein a lower end of the guide rod is connected with the counterweight box, and an upper end of the guide rod is connected with the cross bar;

the cross bar extends above the all-in-one computer and the cross bar is permitted to rotate around the guide rod, a control handle of the two control handles is suspended from the cross bar by the suspension rope;

counter weights are placed in the counterweight box, and a selection lever is connected to the counter weights; and the counter weights are connected with the suspension rope.

16. The application method according to claim 10, wherein the two standing frames have an identical structure, each of the two standing frames comprises a standing base frame, knee blocks, a chest block and a hip block mounted on the standing base frame, the standing base frame is fixed with foot pedal devices, the foot pedal devices comprise a two-foot pedal angle adjustment structure and a two-foot pedal distance adjustment structure.

17. The application method according to claim 16, wherein a vertical column is arranged on the standing base frame, a first sliding frame and a second sliding frame are slidably mounted on the vertical column, the knee blocks are mounted on the first sliding frame, the second sliding frame is provided with the chest block and a hip guard bar, and the hip block is fixed on the hip guard bar; and both the first sliding frame and the second sliding frame are provided with a locking structure, the standing base frame is provided with a second fixing structure for fixing with a bottom frame.

18. The application method according to claim 10, wherein the upper limb rehabilitation training platform is combined with one weight-reducing suspending support structure of the two weight-reducing suspending support structures and one standing frame of the two standing frames; the one weight-reducing suspending support structure and the one standing frame are arranged opposite to each other, on the first and second pairs of sides of the upper limb rehabilitation training platform; and the upper limb rehabilitation training platform is only provided with the single-person upper limb training module.

\* \* \* \* \*